UNITED STATES PATENT OFFICE.

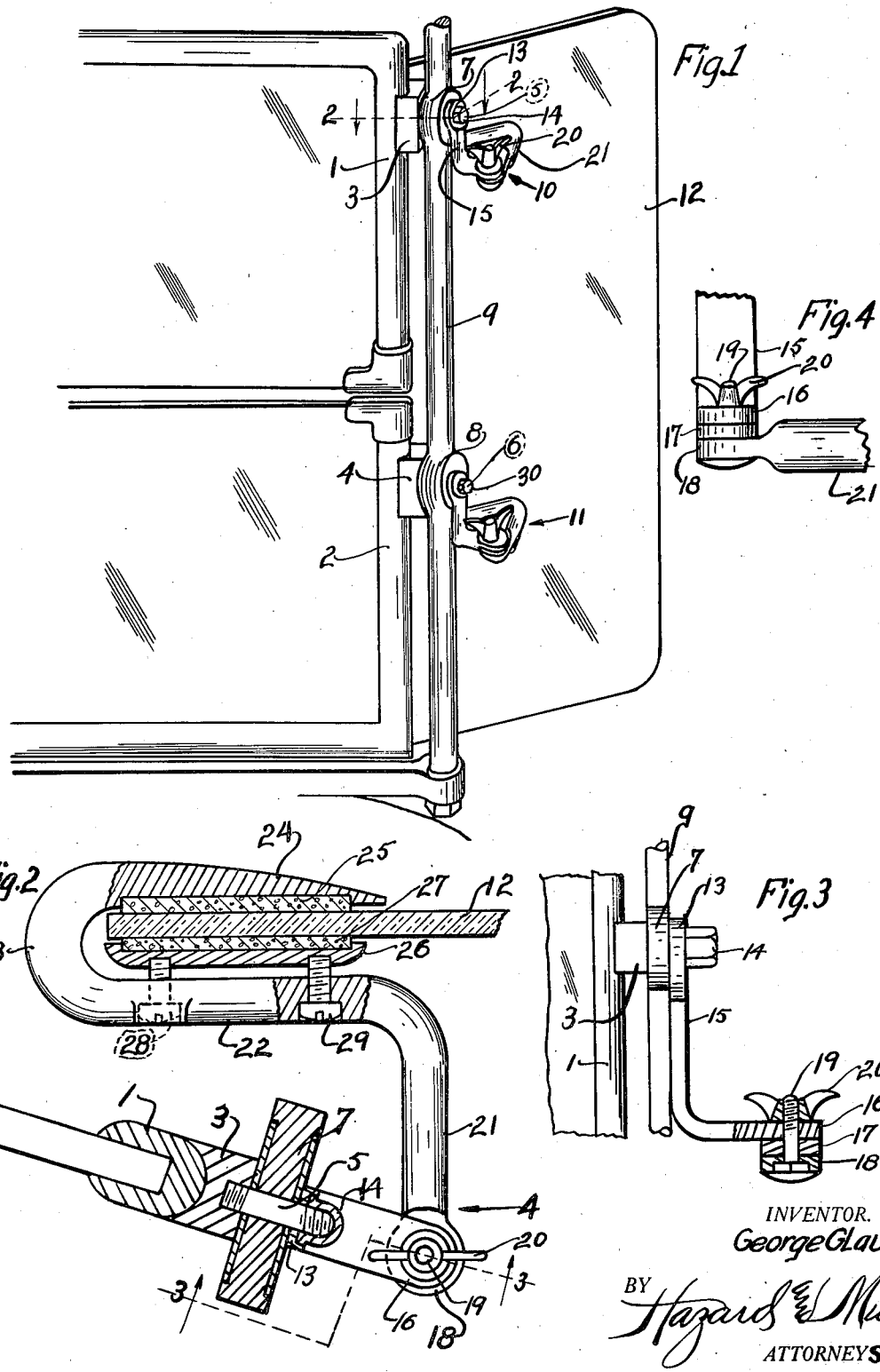

GEORGE GLAUDEL, OF LOS ANGELES, CALIFORNIA.

AUXILIARY WINDSHIELD.

1,343,318.                Specification of Letters Patent.    Patented June 15, 1920.

Application filed August 9, 1919. Serial No. 316,444.

*To all whom it may concern:*

Be it known that I, GEORGE GLAUDEL, a citizen of France, residing at Los Angeles, in the county of Los Angeles and State of California, have invented new and useful Improvements in Auxiliary Windshields, of which the following is a specification.

My object is to make an improved auxiliary wind shield, and my invention consists of the novel features herein shown, described and claimed.

Figure 1 is a fragmentary perspective of a main wind shield with an auxiliary wind shield embodying the principles of my invention in position for use.

Fig. 2 is a fragmentary horizontal section on the line 2—2 of Fig. 1 and looking downwardly as indicated by the arrow.

Fig. 3 is a vertical fragmentary sectional detail on the line 3—3 of Fig. 2.

Fig. 4 is a fragmentary elevation looking in the direction indicated by the arrow 4 in Fig. 2.

The main wind shield has glass frames provided with side bars 1 and 2. Blocks 3 and 4 extend outwardly from the side bars 1 and 2. Screw-threaded studs 5 and 6 extend outwardly from the blocks 3 and 4, and the screw-threaded studs 5 and 6 are inserted through bearings 7 and 8 formed in the supporting side bar 9, and normally wing nuts are placed upon the outer ends of the studs 5 and 6 to hold the main wind shield frames in place.

In applying my auxiliary wind shield, I remove the wing nuts from the studs 5 and 6, place the fittings 10 and 11 upon the studs 5 and 6, and the fittings 10 and 11 carry the auxiliary wind shield plate 12, said plate 12 being preferably of glass. The fittings 10 and 11 are substantially alike, and the details of the fitting 10 are as follows:

A head 13 fits upon the stud 5 against the bearing 7 of the side bar 9. A cap nut 14 is screwed upon the stud against the head 13 to draw the block 3 against the inner side of the bearing 7 and to press the head 13 against the outer side of the bearing 7 and to clamp the parts together to hold the main wind shield frame 2 in an adjusted position and to hold the head 13 rigidly in its desired position.

An arm 15 extends downwardly from the head 13. A bearing 16 extends outwardly from the lower end of the arm 15 into a horizontal position. A hard tubular washer 17 fits against the lower face of the bearing 16. A bearing 18 fits against the lower face of the washer 17. A bolt 19 is inserted upwardly through the bearing 18, through the washer 17 and through the bearing 16, and a wing nut 20 is placed upon the bolt 19, so that the bearing 18 may be readily adjusted and held in its adjusted position by manipulating the wing nut 20.

A spacing arm 21 extends from the bearing 18. A clamping arm 22 extends from the outer end of the arm 21 at right angles. A return bend 23 extends from the opposite end of the clamping arm 22 from the arm 21, and a rigid clamping jaw 24 extends from the opposite end of the return bend 23 from the arm 22 and in position parallel with the arm 22.

A rubber cushion 25 is recessed into the inner face of the rigid clamping jaw 24. The movable clamping jaw 26 matches with the rigid clamping jaw 24 and has a rubber cushion 27 recessed into its inner face in position with the cushion 25. The glass plate 12 fits between the cushions 25 and 27. Screws 28 and 29 are tapped through the clamping arm 22 and the points of the screws fit in sockets in the outer side of the movable clamping jaw 26, and the heads of the screws are recessed into the arm 22, so that by manipulating the screws the jaw 26 may be moved away from the jaw 24 and the glass plate 12 inserted between the cushions 25 and 27 and the screws tightened to securely hold the plates.

The fitting 11 is held in place upon the stud 6 by a cap nut 30. The plate 12 is preferably nearly as long as the height of the two main wind shield frames and is as wide horizontally as may be desired, and the two fittings 10 and 11 spaced a considerable distance apart firmly hold the plate 12 in its upright position, and by manipulating the wing nuts 20 the plate 12 may be adjusted to the desired angle to the main wind shield.

The auxiliary wind shield thus constructed may be placed on either or both sides of a main wind shield. It is simple in construction, easily applied, easily adjusted and not liable to get out of order.

Especial attention is called to the fact that the fittings 10 and 11 may be readily adjusted up and down on the glass plate 12 and adjusted to and from each other to fit the various supporting side bars 9, and that the auxiliary wind shield is applied to the automobile without clamping to the supporting side bars and without in any way covering up or disfiguring the supporting side bars.

When the auxiliary wind shield has been properly adjusted it is only necessary to remove the wing nuts from the studs 5 and 6, place the heads 13 in positions upon the studs and apply the cap nuts 15 and 30.

Various changes may be made without departing from the spirit of my invention as claimed.

I claim:

1. In combination with a wind shield, clamp bars, means for adjustably mounting the clamp bars on the wind shield frame, rigid clamping jaws on said clamping bars, movable clamping jaws, cushions on the inside of said jaws for engaging a glass plate therebetween, and clamping screws in said clamping bars for engaging said movable jaw to cause said jaws to clamp the glass plate.

2. In combination with a wind shield, fittings, heads on said fittings through which the studs of said wind shield are adapted to project, the nuts fitting said studs being adapted to engage said heads to hold said fittings in position, bearings on said fittings, clamp bars, bearings on said clamp bars, bolts extending through the bearings on said fittings and on said clamp bars, wing nuts engaging said bolts to hold said clamp bars adjusted at a suitable angle with relation to the wind shield, and clamping means on said clamp bars for clamping a glass plate.

3. In combination with a wind shield, clamp bars mounted on the wind shield frame, each clamp bar being bent to form a clamp arm and bent at the end of said arm parallel therewith to form a fixed jaw, a movable jaw between said clamp arm and said fixed jaw, screws in said clamp arm engaging said movabe jaw for moving the same toward or away from said fixed jaw, and a glass plate clamped between said fixed jaws and said movable jaws.

In testimony whereof I have signed my name to this specification.

GEORGE GLAUDEL.